(12) United States Patent
Hagihara et al.

(10) Patent No.: US 10,393,581 B2
(45) Date of Patent: Aug. 27, 2019

(54) SPECTROSCOPE

(71) Applicant: JVC KENWOOD CORPORATION, Yokohama-shi, Kanagawa (JP)

(72) Inventors: Yuichi Hagihara, Yokohama (JP); Taiki Kobayashi, Yokohama (JP); Norikazu Takahashi, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 16/217,604

(22) Filed: Dec. 12, 2018

(65) Prior Publication Data
US 2019/0234796 A1 Aug. 1, 2019

(30) Foreign Application Priority Data

Jan. 29, 2018 (JP) .................. 2018-012768
Jan. 29, 2018 (JP) .................. 2018-012785
Jan. 29, 2018 (JP) .................. 2018-012791

(51) Int. Cl.
G01J 3/28 (2006.01)
G01J 3/02 (2006.01)
G01J 3/18 (2006.01)

(52) U.S. Cl.
CPC ............ G01J 3/0229 (2013.01); G01J 3/18 (2013.01); G01J 3/2803 (2013.01)

(58) Field of Classification Search
CPC ........ G01J 3/00; G01J 3/02; G01J 3/28; G01J 3/26; G01J 3/36; G01J 3/18; H04N 5/217; H04N 5/18; H01L 27/146; G02B 5/30; G02B 5/18; G03B 21/28; G01N 21/35; G01N 35/00
See application file for complete search history.

(56) References Cited

U.S. PATENT DOCUMENTS

2015/0206912 A1* 7/2015 Kanamori ............ G02B 26/001
250/208.1

FOREIGN PATENT DOCUMENTS

JP 2011-202971 A 10/2011

* cited by examiner

Primary Examiner — Abdullahi Nur
(74) Attorney, Agent, or Firm — Nath, Goldberg & Meyer; Jerald L. Meyer; Tanya E. Harkins

(57) ABSTRACT

A spectroscope includes a light receiving element and a wavelength selection filter unit. The light receiving element includes a pixel region where a plurality of pixels are disposed. The wavelength selection filter unit is disposed on the pixel region and includes a plurality of wavelength selection filters. The plurality of wavelength selection filters have transmission wavelength characteristics which are different from each other, and split incident light for each wavelength or each wavelength band. The light receiving element generates a light receiving signal by photoelectrically converting light which is split by the wavelength selection filter and is incident on the pixel region, for each pixel.

10 Claims, 15 Drawing Sheets

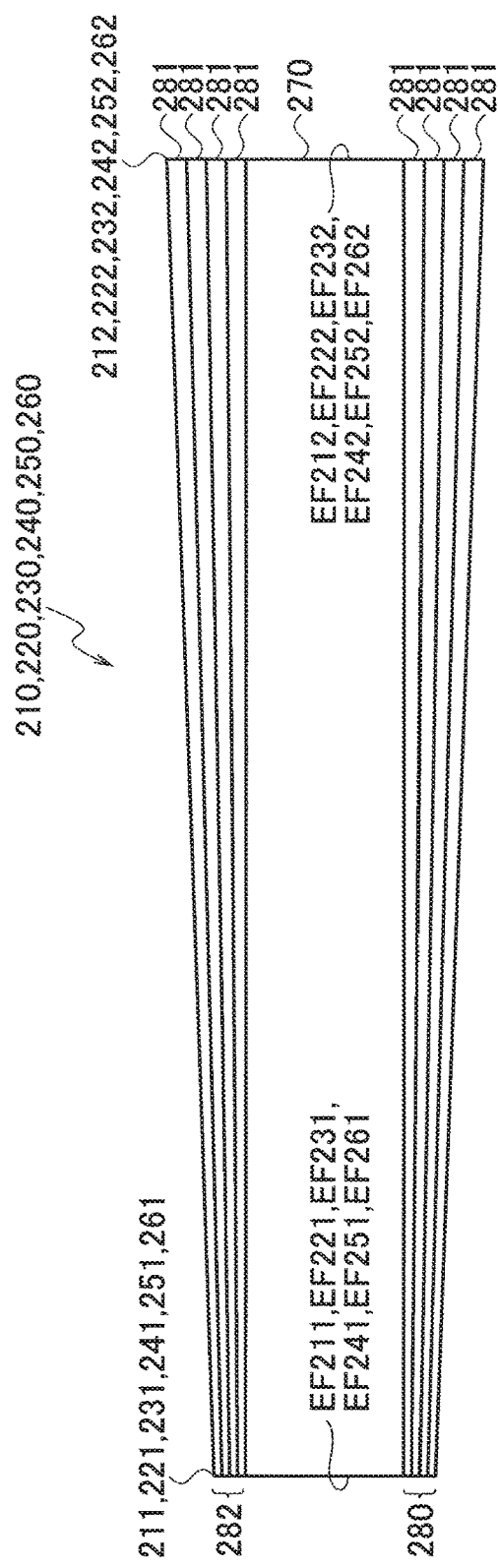

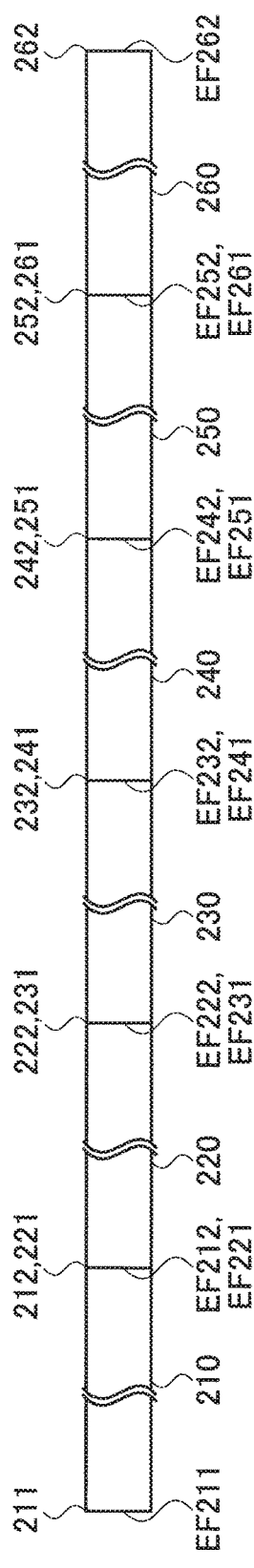

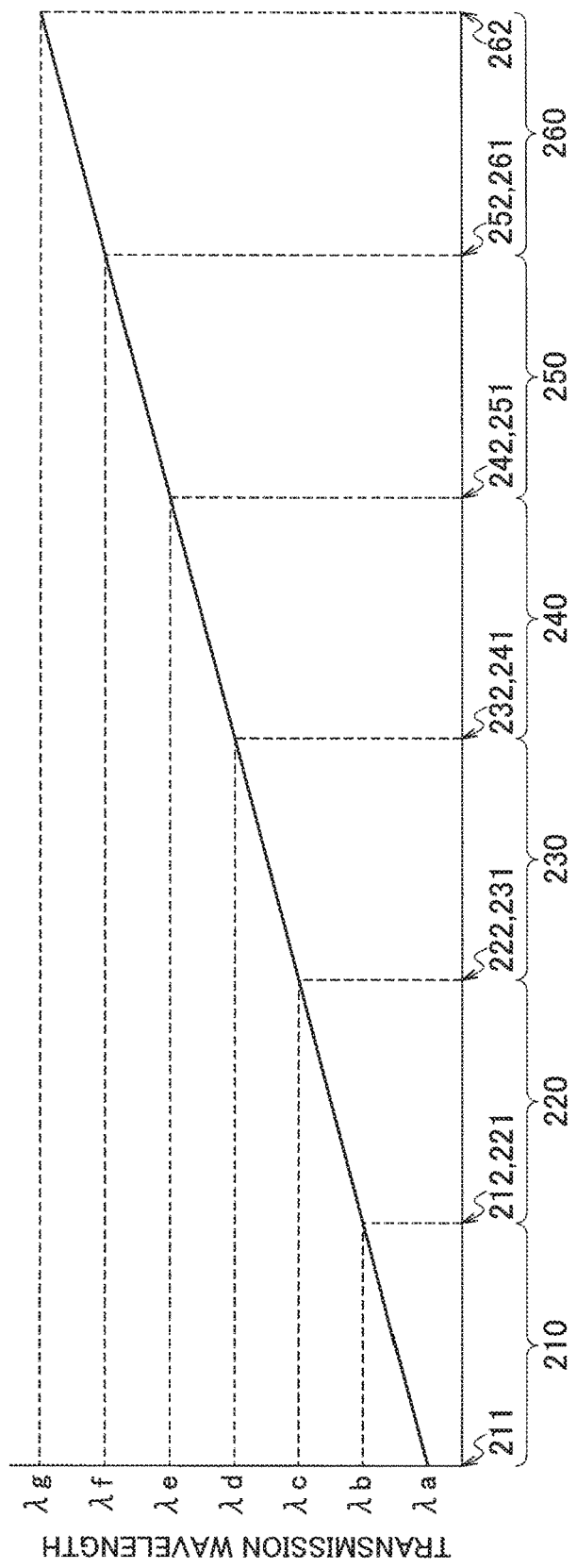

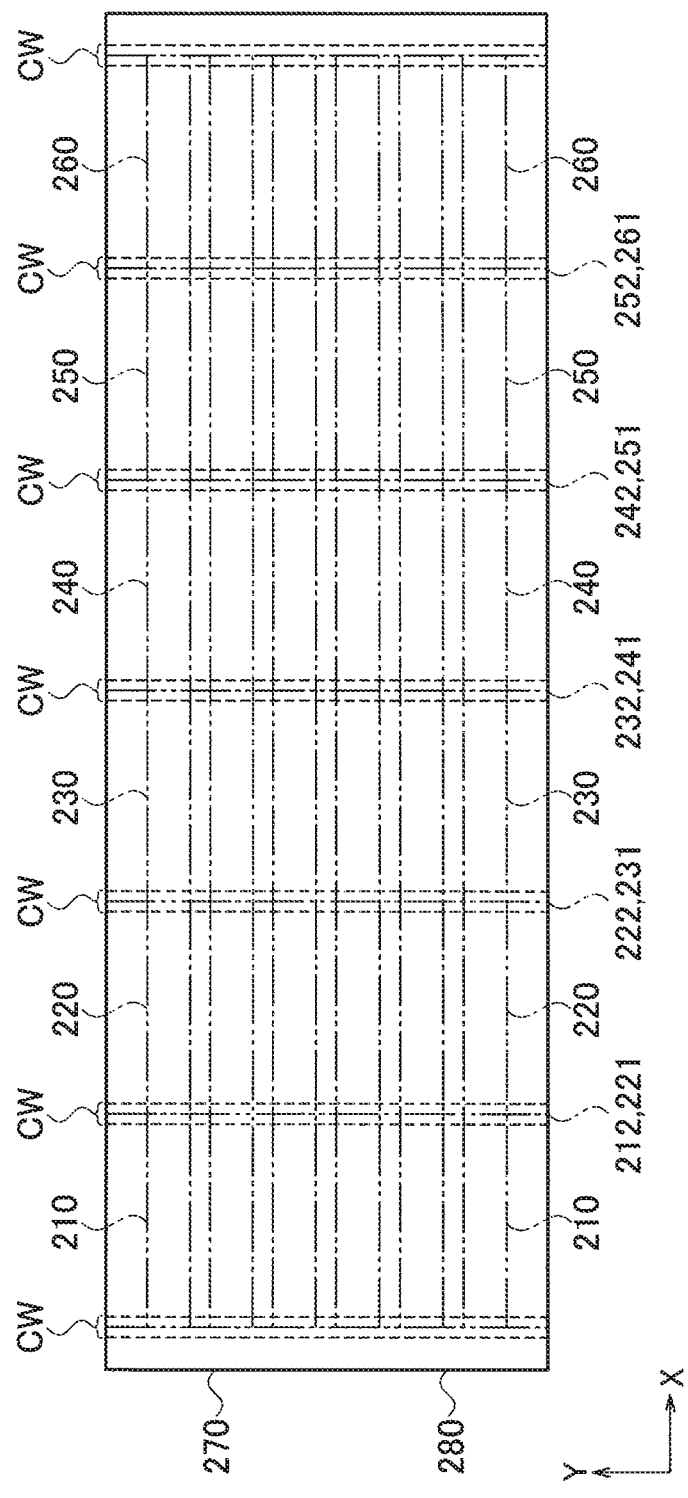

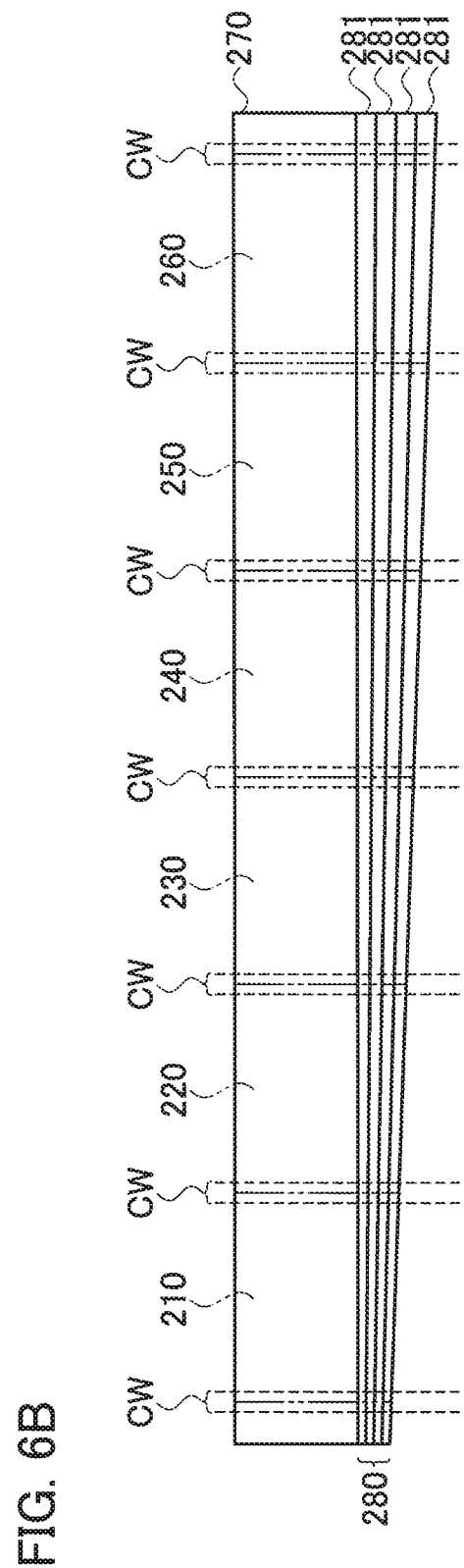

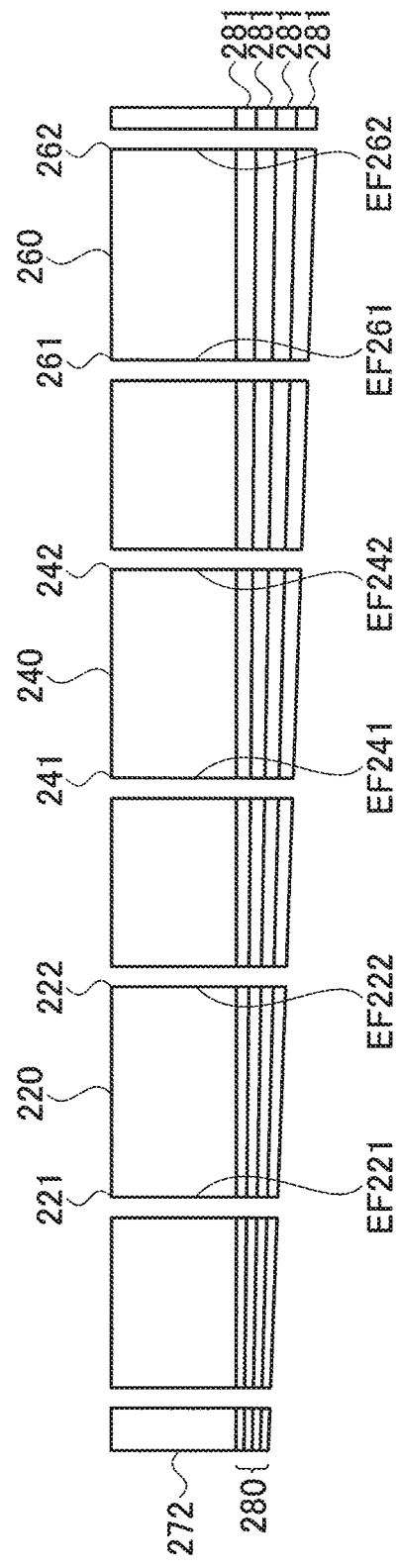

SPECTROSCOPE

CROSS REFERENCE TO RELATED APPLICATION

This application is based upon and claims the benefit of priority under 35 U.S.C. § 119 from Japanese Patent Application No. 2018-012785 filed on Jan. 29, 2018, Japanese Patent Application No. 2018-012768 filed on Jan. 29, 2018, and Japanese Patent Application No. 2018-012791 filed on Jan. 29, 2018, the entire contents of all of which are incorporated herein by reference.

BACKGROUND

The present disclosure relates to a spectroscope.

A spectroscope which splits incident light by using a diffraction grating is described in Japanese Unexamined Patent Application Publication No. 2011-202971. The spectroscope using the diffraction grating splits the incident light by using a fact that diffraction angles are different according to wavelengths.

SUMMARY

In a spectroscope using a diffraction grating, it is required to lengthen a distance from the diffraction grating to a light receiving element in order to separate and detect split incident light with high accuracy. Therefore, in the spectroscope using the diffraction grating, miniaturization of the spectroscope is a problem.

An aspect of one or more embodiments provides a spectroscope, comprising: a light receiving element configured to include a pixel region where a plurality of pixels are disposed; and a wavelength selection filter unit configured to be disposed on the pixel region and configured to include a plurality of wavelength selection filters, wherein the plurality of wavelength selection filters has transmission wavelength characteristics which are different from each other, and split incident light for each wavelength and each wavelength band, and the light receiving element generates a light receiving signal by photoelectrically converting the incident light which is split by the plurality of the wavelength selection filters and is incident on the pixel region, for each pixel.

BRIEF DESCRIPTION OF THE DRAWINGS

FIG. 4B is a side diagram illustrating another configuration example of a wavelength selection filter;

FIG. 5A is a plan diagram illustrating a state where a plurality of wavelength selection filters forming a wavelength selection filter unit are arranged in a row;

FIG. 5B is a diagram illustrating a relationship between each wavelength selection filter and a transmission wavelength in the state illustrated in FIG. 5A;

FIG. 6A is a plan diagram illustrating an example of the related art of a cutting method of a transparent substrate on which a plurality of wavelength selection filters are formed;

FIG. 6B is a side diagram illustrating the example of the related art of the cutting method of the transparent substrate on which the plurality of wavelength selection filters are formed;

FIG. 9B is a side diagram illustrating one or more embodiments of the cutting method of the transparent substrate on which the plurality of wavelength selection filters are formed;

DETAILED DESCRIPTION

First Embodiment

Figure 1:
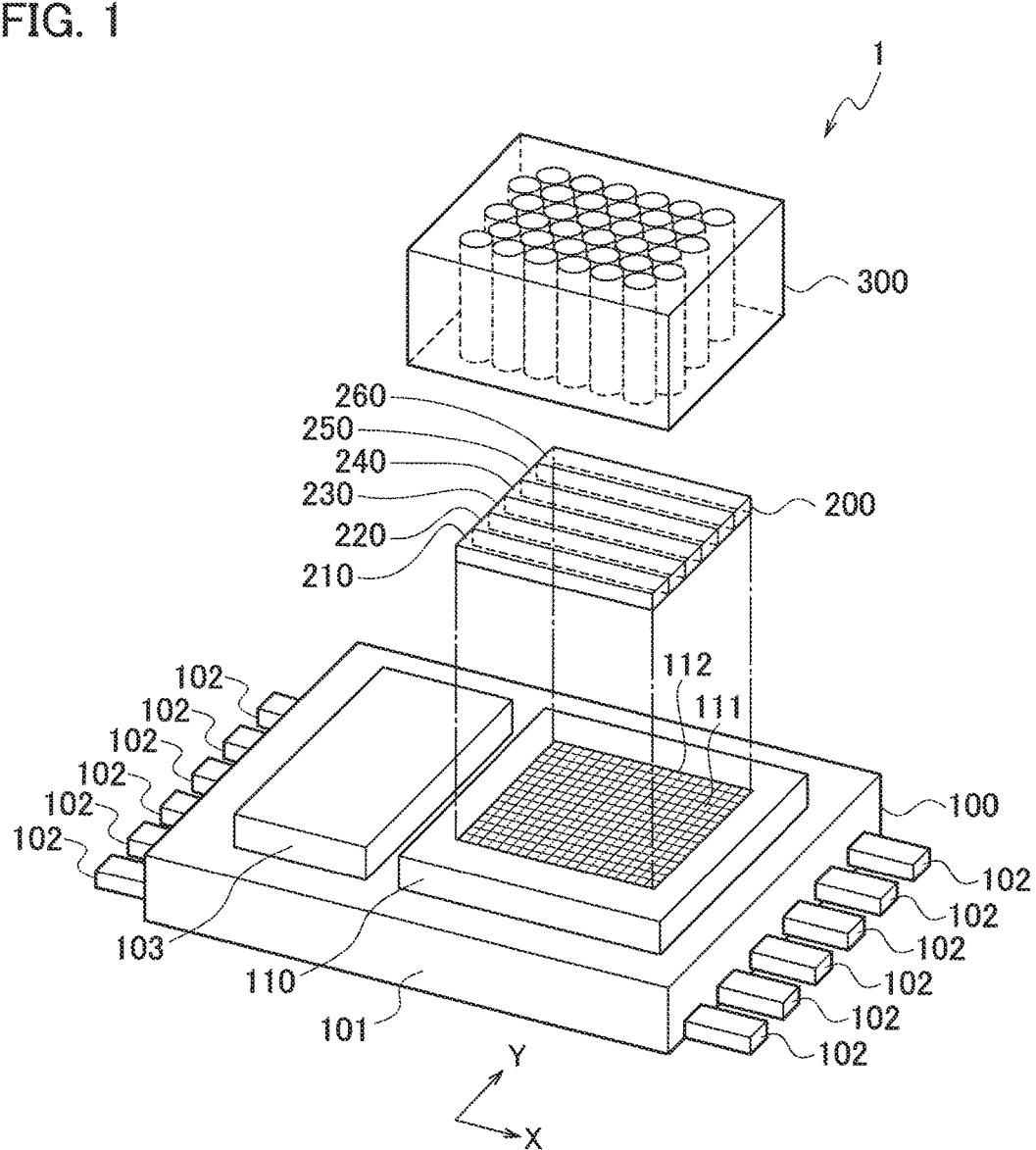
FIG. 1 is an exploded diagram illustrating a configuration example of a spectroscope according to a first embodiment.
Figure 2:
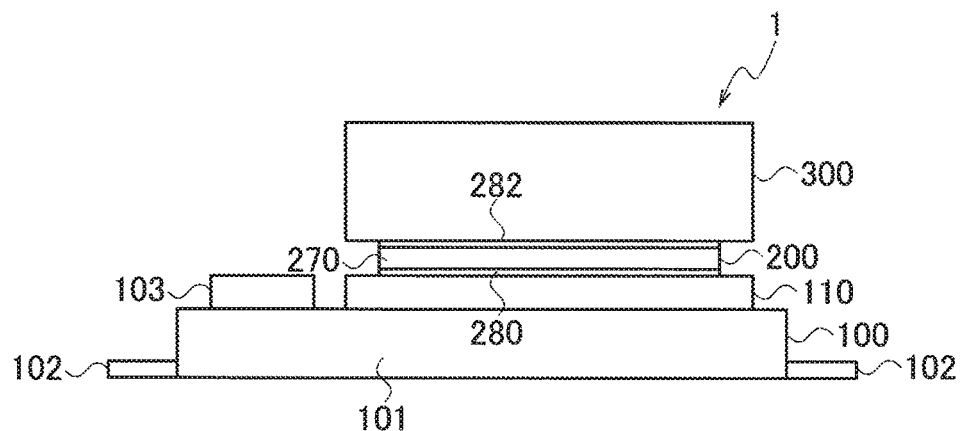
FIG. 2 is a side diagram illustrating the configuration example of the spectroscope according to the first embodiment.

Referring to FIGS. 1, 2, 3, 4A, 4B, 5A, and 5B, a configuration example of a spectroscope of a first embodiment will be described. As illustrated in FIG. 1 or FIG. 2, a spectroscope 1 is provided with a light receiving device 100, a wavelength selection filter unit 200, and an optical element 300.

The light receiving device 100 includes a base 101, a plurality of terminals 102, a control element 103, and a light receiving element 110. The plurality of terminals 102, the control element 103, and the light receiving element 110 are fixed to the base 101. The control element 103 and the light receiving element 110 are connected to the plurality of terminals 102.

The control element 103 controls the light receiving element 110 based upon a control signal inputted from the outside via at least one terminal 102 among the plurality of terminals 102. The control element 103 is, for example, a computation element such as an IC (Integrated circuit).

The light receiving element 110 includes a pixel region 112 where a plurality of pixels 111 are disposed in a first direction (for example, an X-direction) and a second direction (for example, a Y-direction) orthogonal to the first direction. The light receiving element 110 generates a light receiving signal by photoelectrically converting light (incident light), which is incident on the pixel region 112, for each pixel 111.

The light receiving element 110 is a semiconductor element such as a CMOS (Complementary metal oxide semiconductor), a CCD (Charge-coupled device), or a photodiode array, for example. The light receiving element 110 outputs the light receiving signal to the control element 103. The control element 103 performs the signal processing for the light receiving signal and outputs the processed light receiving signal to the outside via at least one terminal 102 among the plurality of terminals 102.

The wavelength selection filter unit 200 is disposed on the pixel region 112 of the light receiving element 110. The wavelength selection filter unit 200 may be disposed to be in contact with the pixel region 112, or may be disposed to be separated therefrom. FIG. 2 illustrates a state where the wavelength selection filter unit 200 is in contact with the pixel region 112.

Figure 3:
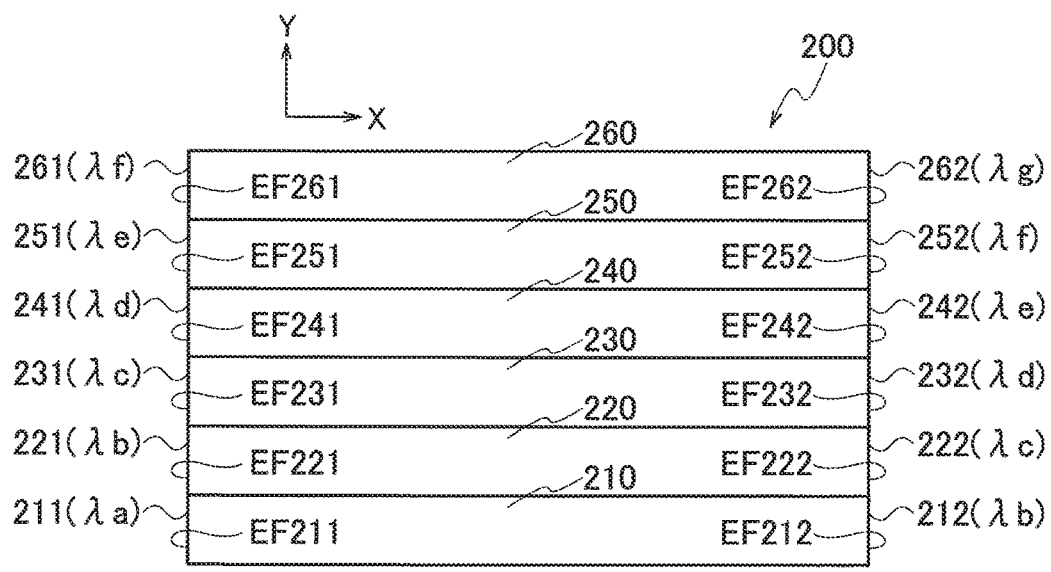
FIG. 3 is a plan diagram illustrating a configuration example of a wavelength selection filter unit.

The wavelength selection filter unit 200 includes a plurality of wavelength selection filters 210, 220, 230, 240, 250, and 260. Each of the wavelength selection filters 210, 220, 230, 240, 250, and 260 has an elongated shape including a longitudinal direction (the first direction) and a short direction (the second direction). The second direction which is the short direction is orthogonal to the first direction which is the longitudinal direction. Further, FIGS. 1 and 3 illustrate 6 pieces of the wavelength selection filters 210, 220, 230, 240, 250, and 260. However, the number of wavelength selection filters is not limited thereto and can be set arbitrarily.

As illustrated in FIG. 1 or FIG. 3, in the wavelength selection filter unit 200, the wavelength selection filters 210, 220, 230, 240, 250, and 260 are disposed side by side in the short direction. The End surfaces EF211, EF212, EF221, EF222, EF231, EF232, EF241, EF242, EF251, EF252, EF261, and EF262 in the longitudinal direction of the wavelength selection filters 210, 220, 230, 240, 250, and 260 are cut surfaces.

FIG. 1 illustrates a state where the wavelength selection filter unit 200 is disposed so that the longitudinal directions of the wavelength selection filters 210, 220, 230, 240, 250, and 260 become the X-directions. Further, the wavelength selection filter unit 200 may be disposed so that the longitudinal directions of the wavelength selection filters 210, 220, 230, 240, 250, and 260 become the Y-directions.

The wavelength selection filters 210, 220, 230, 240, 250, and 260 have transmission wavelength characteristics which are different from each other. As illustrated in FIG. 3, the wavelength selection filter 210 is a linear variable filter which selects and transmits light in a range of wavelengths $\lambda a$ to $\lambda b$ ($\lambda a < \lambda b$) according to a position in the longitudinal direction which is a predetermined direction.

The wavelength selection filter 210 has a transmission wavelength characteristic in which a transmission wavelength continuously or stepwise changes from $\lambda a$ to $\lambda b$, from one end part 211 to the other end part 212 in the longitudinal direction. Accordingly, the wavelength selection filter 210 can separate the light in the range of the wavelengths $\lambda a$ to $\lambda b$ for each wavelength or each wavelength band according to the range or the position in the longitudinal direction.

The wavelength selection filter 220 is a linear variable filter which selects and transmits light in a range of wavelengths $\lambda b$ to $\lambda c$ ($\lambda b < \lambda c$) according to a position in the longitudinal direction which is a predetermined direction. The wavelength selection filter 220 has a transmission wavelength characteristic in which a transmission wavelength continuously or stepwise changes from $\lambda b$ to $\lambda c$, from one end part 221 to the other end part 222 in the longitudinal direction. Accordingly, the wavelength selection filter 220 can separate the light in the range of the wavelengths $\lambda b$ to $\lambda c$ for each wavelength or each wavelength band according to the range or the position in the longitudinal direction.

The wavelength selection filter 230 is a linear variable filter which selects and transmits light in a range of wavelengths $\lambda c$ to $\lambda d$ ($\lambda c < \lambda d$) according to a position in the longitudinal direction which is a predetermined direction. The wavelength selection filter 230 has a transmission wavelength characteristic in which a transmission wavelength continuously or stepwise changes from $\lambda c$ to $\lambda d$, from one end part 231 to the other end part 232 in the longitudinal direction. Accordingly, the wavelength selection filter 230 can separate the light in the range of the wavelengths $\lambda c$ to $\lambda d$ for each wavelength or each wavelength band according to the range or the position in the longitudinal direction.

The wavelength selection filter 240 is a linear variable filter which selects and transmits light in a range of wavelengths $\lambda d$ to $\lambda e$ ($\lambda d < \lambda e$) according to a position in the longitudinal direction which is a predetermined direction. The wavelength selection filter 240 has a transmission wavelength characteristic in which a transmission wavelength continuously or stepwise changes from $\lambda d$ to $\lambda e$, from one end part 241 to the other end part 242 in the longitudinal direction. Accordingly, the wavelength selection filter 240 can separate the light in the range of the wavelengths $\lambda d$ to $\lambda e$ for each wavelength or each wavelength band according to the range or the position in the longitudinal direction.

The wavelength selection filter 250 is a linear variable filter which selects and transmits light in a range of wavelengths $\lambda e$ to $\lambda f$ ($\lambda e < \lambda f$) according to a position in the longitudinal direction which is a predetermined direction. The wavelength selection filter 250 has a transmission wavelength characteristic in which a transmission wavelength continuously or stepwise changes from $\lambda e$ to $\lambda f$, from one end part 251 to the other end part 252 in the longitudinal direction. Accordingly, the wavelength selection filter 250 can separate the light in the range of the wavelengths $\lambda e$ to $\lambda f$ for each wavelength or each wavelength band according to the range or the position in the longitudinal direction.

The wavelength selection filter 260 is a linear variable filter which selects and transmits light in a range of wavelengths $\lambda f$ to $\lambda g$ ($\lambda f < \lambda g$) according to a position in the longitudinal direction which is a predetermined direction. The wavelength selection filter 260 has a transmission wavelength characteristic in which a transmission wavelength continuously or stepwise changes from $\lambda f$ to $\lambda g$, from one end part 261 to the other end part 262 in the longitudinal direction. Accordingly, the wavelength selection filter 260 can separate the light in the range of the wavelengths $\lambda f$ to $\lambda g$ for each wavelength or each wavelength band according to the range or the position in the longitudinal direction.

Figure 4A:
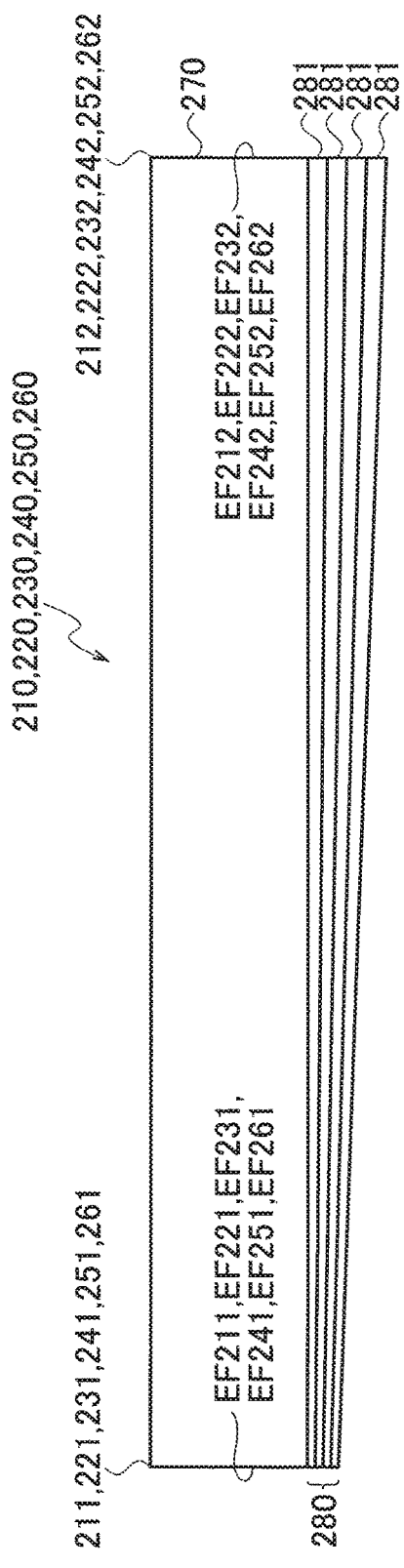
FIG. 4A is a side diagram illustrating a configuration example of a wavelength selection filter.
Figure 7:
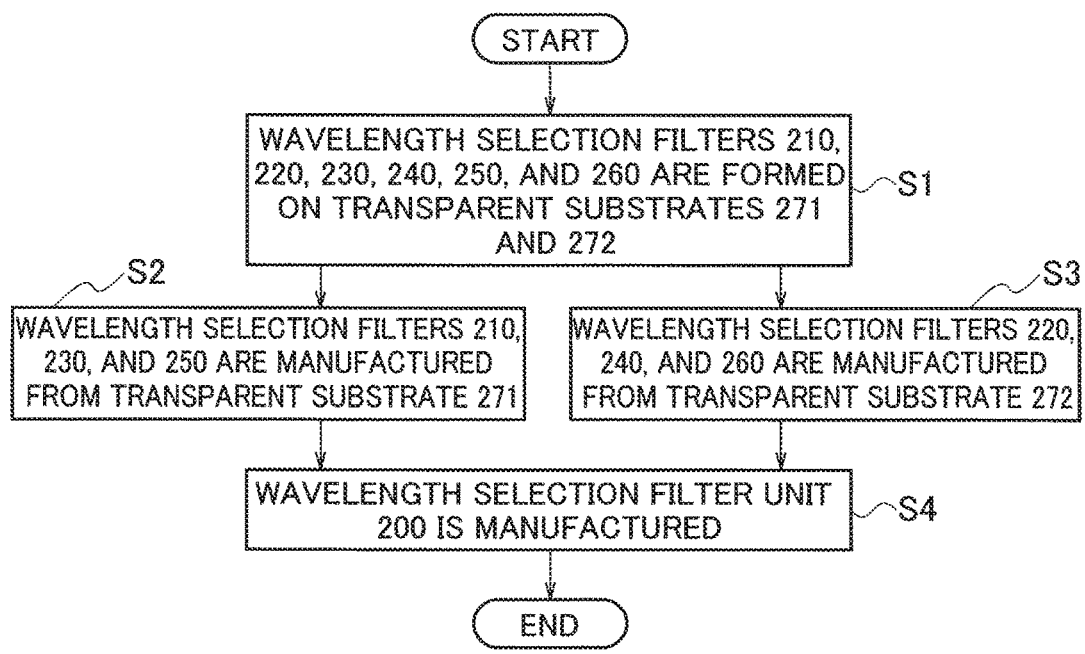
FIG. 7 is a flowchart for describing a manufacturing method of a wavelength selection filter unit.

Referring to FIGS. 4A and 4B, configuration examples of the wavelength selection filter 210, 220, 230, 240, 250, and 260 will be described.

As illustrated in FIG. 4A, the wavelength selection filters 210, 220, 230, 240, 250, and 260 respectively include a transparent substrate 270 and a dielectric multilayer film 280. The dielectric multilayer film 280 includes a laminated structure in which dielectric films 281 having different refractive indexes are alternately laminated. In each dielectric film 281, material parameters such as film thickness or a material continuously change in the longitudinal direction of the wavelength selection filters 210, 220, 230, 240, 250 and 260.

FIGS. 4A and 4B illustrate a case in which the film thickness of each dielectric film 281 continuously changes in the longitudinal direction of the wavelength selection filters 210, 220, 230, 240, 250, and 260. Further, FIGS. 4A and 4B are schematic diagrams in which the wavelength selection filters 210, 220, 230, 240, 250, and 260 are enlarged in a thickness direction in order to make it easy to understand a change in the film thickness of each dielectric film 281.

Each material parameter is set so as to be different according to the wavelength selection filters 210, 220, 230, 240, 250, and 260. Accordingly, the wavelength selection filters 210, 220, 230, 240, 250, and 260 have the above-mentioned transmission wavelength characteristics. It is desirable that the wavelength selection filter unit 200 is disposed so that the dielectric multilayer film 280 faces the pixel region 112.

As illustrated in FIG. 4B, the wavelength selection filters 210, 220, 230, 240, 250, and 260 may have a configuration in which a dielectric multilayer film 282 having the same laminated structure as that of the dielectric multilayer film 280 is formed on a surface which is opposite to a surface of the transparent substrate 270 on which the dielectric multilayer film 280 is formed.

A stress of one dielectric multilayer film 280 with respect to the transparent substrate 270 can be canceled by the other dielectric multilayer film 282 by forming the dielectric multilayer films on the opposite surfaces of the transparent substrate 270. Accordingly, warpage in the longitudinal direction of the wavelength selection filters 210, 220, 230, 240, 250, and 260 by one dielectric multilayer film 280 can be reduced by the other dielectric multilayer film 282.

Further, in FIG. 1, the wavelength selection filters 210, 220, 230, 240, 250, and 260 are illustrated in a state where the dielectric multilayer films 280 and 282 are omitted. In FIG. 2, the dielectric multilayer films 280 and 282 are illustrated in a simplified manner.

Referring to FIGS. 5A and 5B, a transmission wavelength characteristic of the wavelength selection filter unit 200 will be described.

FIG. 5A illustrates a state where the wavelength selection filters 210, 220, 230, 240, 250, and 260 are arranged in a row. Specifically, FIG. 5A illustrates a state where the end surface EF212 of the wavelength selection filter 210 and the end surface EF221 of the wavelength selection filter 220 are in contact with each other, and the end surface EF222 of the wavelength selection filter 220 and the end surface EF231 of the wavelength selection filter 230 are in contact with each other.

FIG. 5A further illustrates a state where the end surface EF232 of the wavelength selection filter 230 and the end surface EF241 of the wavelength selection filter 240 are in contact with each other; the end surface EF242 of the wavelength selection filter 240 and the end surface EF251 of the wavelength selection filter 250 are in contact with each other; and the end surface EF252 of the wavelength selection filter 250 and the end surface EF261 of the wavelength selection filter 260 are in contact with each other.

That is, FIG. 5A illustrates a state where the wavelength selection filters 210, 220, 230, 240, 250, and 260 are arranged in a row in the longitudinal direction so that the end surfaces of the respective end parts in the longitudinal direction of the wavelength selection filters 210, 220, 230, 240, 250, and 260 are in contact with each other. FIG. 5B illustrates a relationship of the transmission wavelengths of the respective wavelength selection filter 210, 220, 230, 240, 250, and 260 in the state illustrated in FIG. 5A.

When the wavelength selection filters 210, 220, 230, 240, 250, and 260 are arranged in a row as illustrated in FIG. 5A, as illustrated in FIG. 5B, the wavelength selection filter unit 200 has a transmission wavelength characteristic in which the transmission wavelength continuously changes from $\lambda a$ (a first transmission wavelength) to $\lambda g$ (a second transmission wavelength), from the end part 211 of the wavelength selection filter 210 corresponding to one end part in the longitudinal direction to the end part 262 of the wavelength selection filter 260 corresponding to the other end part.

Accordingly, the wavelength selection filter unit 200 including the wavelength selection filters 210, 220, 230, 240, 250, and 260 functions as a linear variable filter having the transmission wavelength characteristic in which the transmission wavelength continuously changes from $\lambda a$ to $\lambda g$.

As illustrated in FIGS. 6A and 6B, when the dielectric multilayer film 280 is formed on one transparent substrate 270 and the plurality of wavelength selection filters 210, 220, 230, 240, 250, and 260 are formed, the wavelength selection filters 210, 220, 230, 240, 250, and 260 are continuously formed.

FIG. 6B illustrates a case in which film thickness of each dielectric film 281 continuously changes in the longitudinal direction of the wavelength selection filters 210, 220, 230, 240, 250, and 260. Further, FIG. 6B is a schematic diagram in which the wavelength selection filters 210, 220, 230, 240, 250, and 260 are enlarged in a thickness direction in order to make it easy to understand the change in the film thickness of each dielectric film 281.

When the transparent substrate 270 is cut in the Y-direction in order to separate the wavelength selection filters 210, 220, 230, 240, 250, and 260, the end parts 212, 221, 222, 231, 232, 241, 242, 251, 252, and 261 of the wavelength selection filters 210, 220, 230, 240, 250, and 260, and neighboring regions thereof are cut according to a cutting width CW.

Therefore, when the wavelength selection filter unit 200 is manufactured by using the wavelength selection filters 210, 220, 230, 240, 250, and 260 manufactured by the cutting method illustrated in FIGS. 6A and 6B, the transmission wavelength characteristic illustrated in FIG. 5B cannot be obtained.

Further, one embodiment of a method of manufacturing the wavelength selection filter unit 200 will be described with reference to a flowchart illustrated in FIG. 7, and FIGS. 8A, 8B, 9A, and 9B. As illustrated in FIG. 8A, 8B, 9A, or 9B, an operator forms the dielectric multilayer film 280 on a plurality of transparent substrates 271 and 272 in Step S1 of the flowchart illustrated in FIG. 7. Accordingly, the plurality of wavelength selection filters 210, 220, 230, 240, 250, and 260 are continuously formed on the plurality of transparent substrates 271 and 272, respectively. FIGS. 8B and 9B illustrate a case in which the film thickness of each dielectric film 281 continuously changes in the longitudinal direction of the wavelength selection filters 210, 220, 230, 240, 250, and 260. Further, FIGS. 8B and 9B are schematic diagrams in which the wavelength selection filters 210, 220, 230, 240, 250, and 260 are enlarged in the thickness direction in order to make it easy to understand the change in the film thickness of each dielectric film 281. Further, the operator may form the dielectric multilayer film 282 on a surface which is opposite to a surface of the transparent substrate 270 on which the dielectric multilayer film 280 is formed.

Figure 8A:
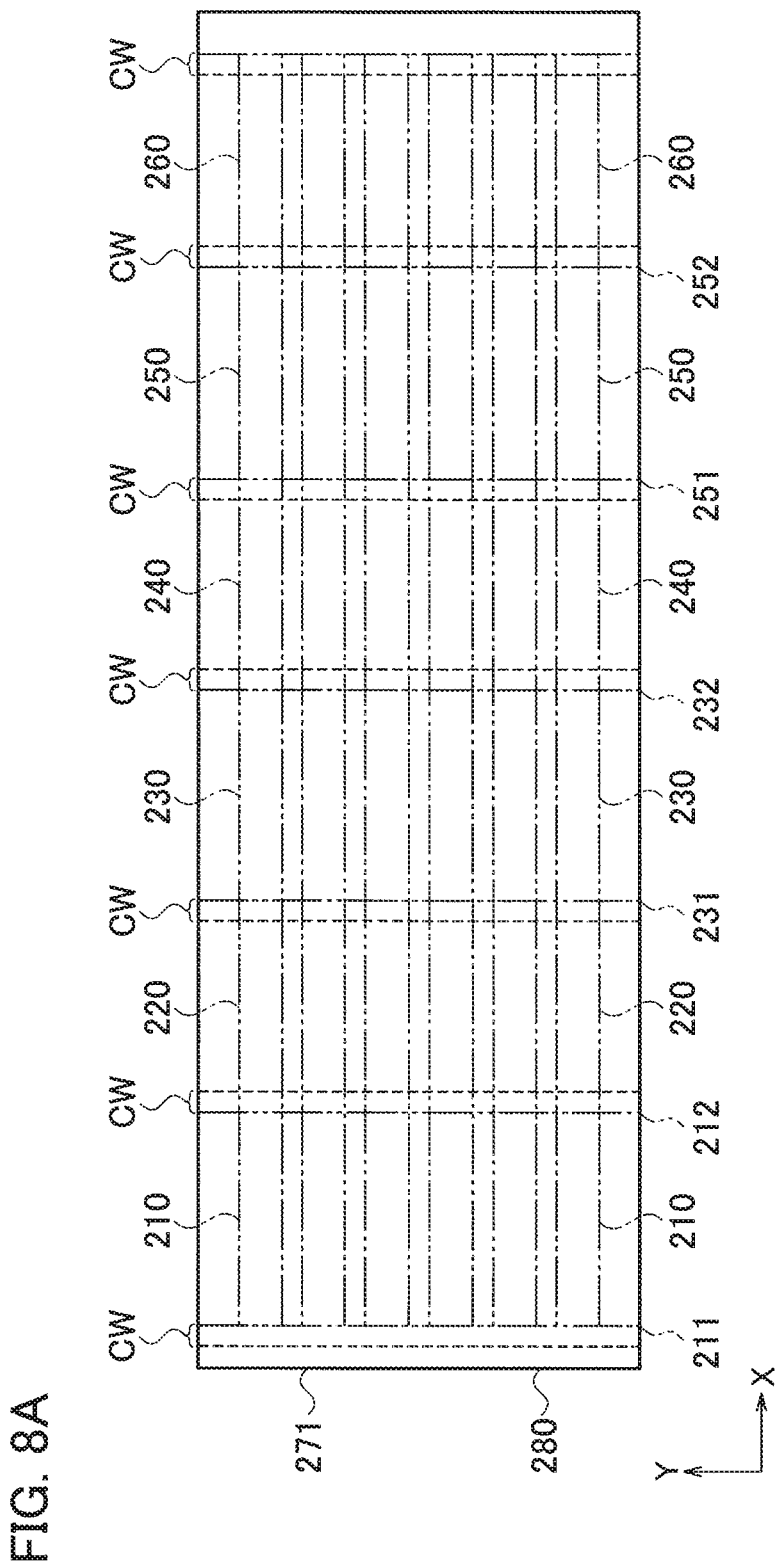
FIG. 8A is a plan diagram illustrating one or more embodiments of a cutting method of a transparent substrate on which a plurality of wavelength selection filters are formed.
Figure 8B:
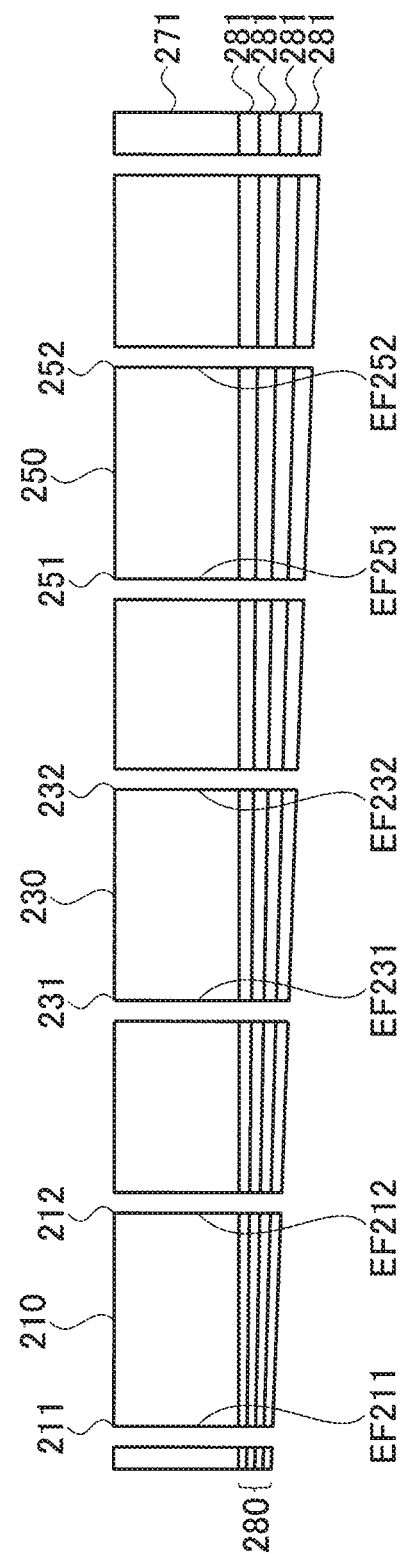
FIG. 8B is a side diagram illustrating one or more embodiments of the cutting method of the transparent substrate on which the plurality of wavelength selection filters are formed.
Figure 9A:
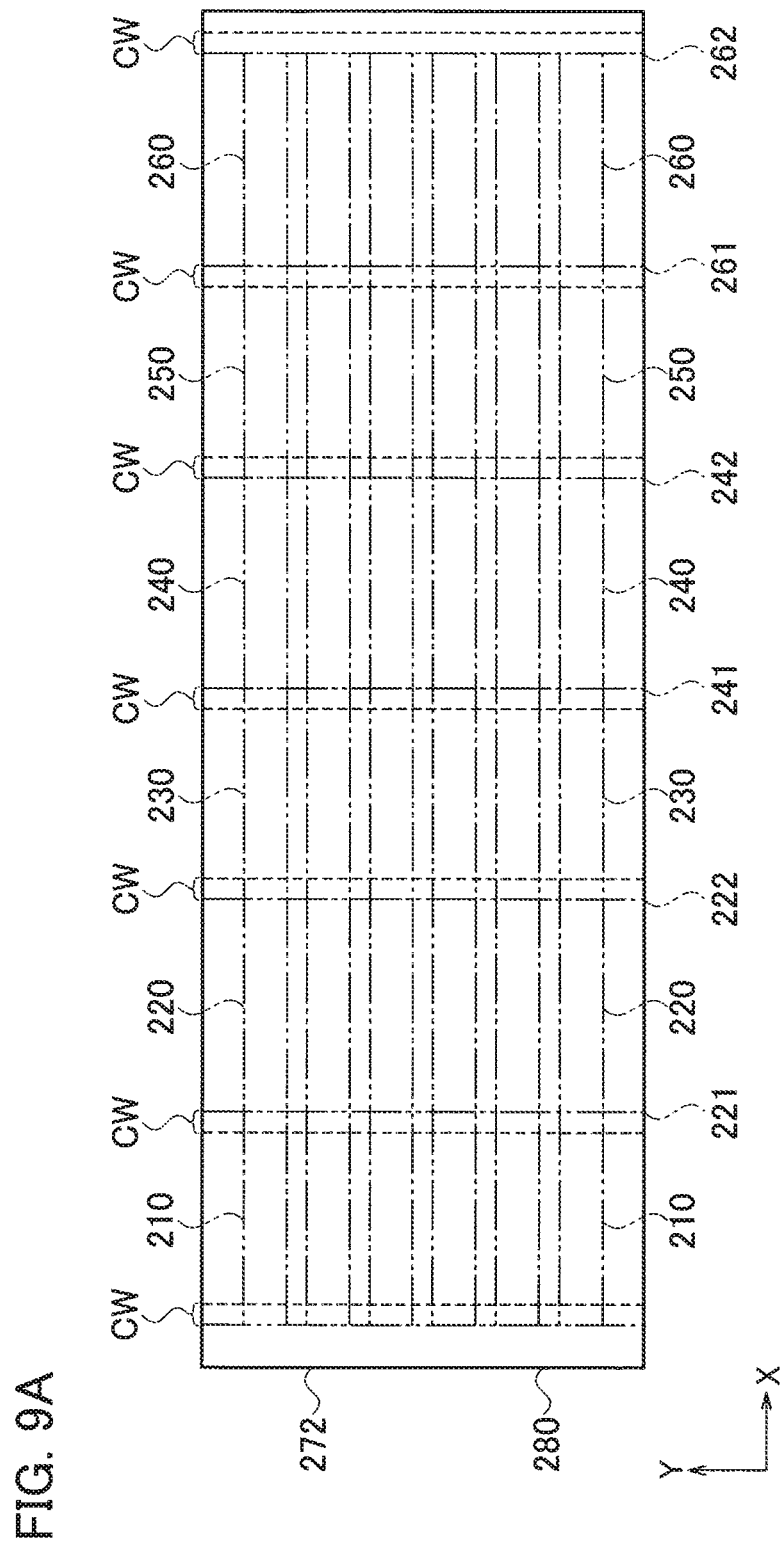
FIG. 9A is a plan diagram illustrating one or more embodiments of a cutting method of a transparent substrate on which a plurality of wavelength selection filters are formed.

As illustrated in FIG. 8A or 8B, the operator adjusts cutting positions so that cut surfaces are positioned at the end parts 211 and 212 of the wavelength selection filter 210, the end parts 231 and 232 of the wavelength selection filter 230, and the end parts 251 and 252 of the wavelength selection filter 250, and the transparent substrate 271 is cut in the Y-direction in Step S2.

Accordingly, the end surfaces EF211, EF212, EF231, EF232, EF251, and EF252 in the longitudinal direction of the wavelength selection filters 210, 230, and 250 become the cut surfaces. Further, the end parts 221 and 222 of the wavelength selection filter 220 and neighboring regions thereof, the end parts 241 and 242 of the wavelength selection filter 240 and neighboring regions thereof, and the end parts 261 and 262 of the wavelength selection filter 260 and neighboring regions thereof are cut.

Furthermore, the operator can manufacture the plurality of wavelength selection filters 210, 230, and 250 from one transparent substrate 271 by cutting the transparent substrate 271 in the X-direction.

As illustrated in FIG. 9A or FIG. 9B, the operator adjusts cutting positions so that cut surfaces are positioned at the end parts 221 and 222 of the wavelength selection filter 220, the end parts 241 and 242 of the wavelength selection filter 240, and the end parts 261 and 262 of the wavelength selection filter 260, and the transparent substrate 272 is cut in the Y-direction in Step S3.

Accordingly, the end surfaces EF221, EF222, EF241, EF242, EF261, and EF262 in the longitudinal direction of the wavelength selection filters 220, 240, and 260 become the cut surfaces. Further, the end parts 211 and 212 of the wavelength selection filter 210 and neighboring regions thereof, the end parts 231 and 232 of the wavelength selection filter 230 and neighboring regions thereof, and the end parts 251 and 252 of the wavelength selection filter 250 and neighboring regions thereof are cut.

Furthermore, the operator can manufacture the plurality of wavelength selection filters 220, 240, and 260 from one transparent substrate 272 by cutting the transparent substrate 272 in the X-direction.

In Step S4, the operator can manufacture the wavelength selection filter unit 200 having the transmission wavelength characteristic illustrated in FIG. 5B by combining the wavelength selection filters 210, 230, and 250 manufactured in Step S2 and the wavelength selection filters 220, 240, and 260 manufactured in Step S3.

As illustrated in FIG. 1 or FIG. 2, the optical element 300 is disposed on the wavelength selection filter unit 200. The optical element 300 may be disposed to be in contact with the wavelength selection filter unit 200, or may be disposed to be separated therefrom. In FIG. 2, the optical element 300 is in contact with the wavelength selection filter unit 200.

The optical element 300 converts incident light into parallel light. For example, the optical element 300 can convert incident light into parallel light by adopting a configuration in which the optical element 300 includes a plurality of optical fibers or rod lenses. Further, the optical element 300 is not limited thereto as long as the optical element 300 has a configuration in which incident light can be converted into parallel light.

The incident light which is converted into parallel light by the optical element 300 is split for each wavelength or each wavelength band by the wavelength selection filter unit 200. The incident light which is split by the wavelength selection filter unit 200 is respectively incident on the corresponding pixel 111.

It is possible to shorten the optical path length of the incident light, which is converted into parallel light by the optical element 300, by bringing the optical element 300, the wavelength selection filter unit 200, and the light receiving element 110 into contact with each other.

Thus, the light transmitted through the wavelength selection filter unit 200 can be incident on the target pixel 111 with high accuracy.

For example, a case will be described in which the respective longitudinal directions of the wavelength selection filters 210, 220, 230, 240, 250 and 260 correspond to 100 pieces of the pixels 111 disposed in the X-direction in the pixel region 112, and the respective short directions thereof correspond to 20 pieces of the pixels 111 disposed in the Y-direction in the pixel region 112.

Light rays having respectively different wavelengths are incident on 100 pieces of the pixels 111 disposed in the X-direction by the wavelength selection filter 210. On the other hand, light rays having the same wavelength are incident on 20 pieces of the pixels 111 disposed in the Y-direction.

The control element 103 can set the number of pixels (m) in the X-direction and the number of pixels (n) in the Y-direction. When the number of pixels in the Y-direction is set to 20 (n=20) according to the length in the Y-direction of the wavelength selection filter 210, the control element 103 selects 20 pieces of the pixels 111 disposed in the Y-direction. Further, the control element 103 adds light receiving signals generated by the selected 20 pieces of the pixels 111.

The control element 103 outputs the added light receiving signals to the outside via at least one terminal 102 among the plurality of terminals 102. A signal level of the outputted signals can be increased by adding the light receiving signals of 20 pieces of the pixels 111.

Signal processing for adding the light receiving signals of the 20 pieces of the pixels 111 is effective when light quantity of the incident light is small. Further, the control element 103 may output the light receiving signals generated by the selected 20 pieces of the pixels 111 to the outside without addition, and may add the light receiving signals on the outside.

When the number of pixels in the Y-direction is set to, for example, 4 (n=4), the control element 103 selects 4 pieces of the pixels 111 at a center part among 20 pieces of the pixels 111 disposed in the Y-direction. 4 pieces of the pixels 111 at the center part are positioned at a center part of the wavelength selection filter 210 in the short direction. Further, the control element 103 adds only the light receiving signals of the selected 4 pieces of the pixels 111.

The control element 103 outputs the added light receiving signals to the outside via at least one terminal 102 among the plurality of terminals 102. The control element 103 may output the light receiving signals generated by the selected 4 pieces of the pixels 111 to the outside without addition, and may add the light receiving signals on the outside.

An influence of crosstalk caused by unnecessary light from the wavelength selection filter 220 adjacent to the wavelength selection filter 210 can be reduced by adding only the light receiving signals of the pixels 111 at the center part. Detection accuracy can be improved by the signal processing for adding only the light receiving signals of the pixels 111 at the center part.

The signal processing in the wavelength selection filters 220, 230, 240, 250 and 260 is the same as the signal processing in the wavelength selection filter 210.

In the spectroscope 1, the wavelength selection filter unit 200 including the wavelength selection filters 210, 220, 230, 240, 250, and 260 functions as the linear variable filter having the transmission wavelength characteristic in which the transmission wavelength continuously changes from $\lambda a$ to $\lambda g$.

In the spectroscope 1, since the incident light is split by the wavelength selection filter unit 200 functioning as the linear variable filter, the wavelength selection filter unit 200 can be disposed in the vicinity of the pixel region 112 of the light receiving element 110. Accordingly, the spectroscope 1 can be miniaturized in comparison with a spectroscope using a diffraction grating. Further, in the spectroscope 1, it is also possible to dispose the wavelength selection filter unit 200 in a state of being in contact with the pixel region 112 of the light receiving element 110.

In the spectroscope 1, the control element 103 can set the number of pixels in the X-direction and the Y-direction. When the light quantity of the incident light is small, the control element 103 sets the number of pixels to be large, and when the detection accuracy is improved, the control element 103 sets the number of pixels to be small and adds only the light receiving signals of the pixels 111 at the center part. That is, the spectroscope 1 can perform the signal processing for the light receiving signal generated for each pixel 111 depending on the purpose.

Second Embodiment

Figure 10:
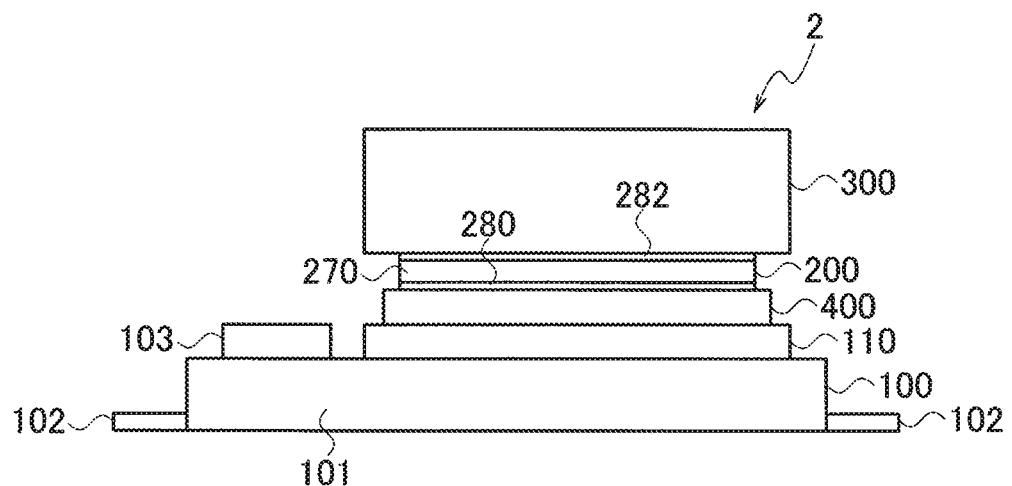
FIG. 10 is a side diagram illustrating a configuration example of a spectroscope according to a second embodiment.

Referring to FIG. 10, a configuration example of a spectroscope according to a second embodiment will be described. FIG. 10 corresponds to FIG. 2. Further, in order to simplify descriptions, the same reference signs will be denoted to the same components as those of the spectroscope 1 according to the first embodiment.

As illustrated in FIG. 10, a spectroscope 2 is provided with the light receiving device 100, the wavelength selection filter unit 200, and optical elements 300 and 400. The light receiving device 100 includes the base 101, the plurality of terminals 102, the control element 103, and the light receiving element 110. The plurality of terminals 102, the control element 103, and the light receiving element 110 are fixed to the base 101. The control element 103 and the light receiving element 110 are connected to the plurality of terminals 102. The light receiving element 110 includes the pixel region 112 in which the plurality of pixels 111 are disposed in the X-direction and the Y-direction.

The optical element 300 (a first optical element) converts incident light into parallel light. The incident light which is converted into the parallel light by the optical element 300 is incident on the wavelength selection filter unit 200. The wavelength selection filter unit 200 includes the wavelength selection filters 210, 220, 230, 240, 250, and 260. The wavelength selection filters 210, 220, 230, 240, 250, and 260 respectively include the transparent substrate 270 and the dielectric multilayer film 280.

The dielectric multilayer film 280 is formed on a surface which faces the optical element 400 on the transparent substrate 270. The wavelength selection filters 210, 220, 230, 240, 250 and 260 may be configured so that the dielectric multilayer film 282 is formed on a surface which is opposite to a surface of the transparent substrate 270 on which the dielectric multilayer film 280 is formed.

The incident light is split for each wavelength or each wavelength band by the wavelength selection filter unit 200. The incident light which is split by the wavelength selection filter unit 200 is incident on the optical element 400.

The optical element 400 (a second optical element) is disposed in a gap between the wavelength selection filter unit 200 and the light receiving element 110. The optical element 400 may be disposed to be in contact with the wavelength selection filter unit 200 and the light receiving element 110, or may be disposed to be separated therefrom. FIG. 10 illustrates a state where the optical element 400 is in contact with the wavelength selection filter unit 200 and the light receiving element 110.

The optical element 400 has the same function as that of the optical element 300. That is, the optical element 400 converts incident light into parallel light. For example, the optical element 400 can convert incident light into parallel light by adopting a configuration in which the optical element 400 includes a plurality of optical fibers or rod lenses. Further, the optical element 400 is not limited thereto as long as the optical element 400 has a configuration in which incident light can be converted into parallel light.

The incident light, which is split by the wavelength selection filter unit 200 and is converted into parallel light by the optical element 400, is incident on the corresponding pixel 111 of each pixel region 112 of the light receiving element 110.

The control element 103 controls the light receiving element 110 based upon a control signal inputted from the outside via at least one terminal 102 among the plurality of terminals 102. The light receiving element 110 generates a light receiving signal by photoelectrically converting the light incident on the pixel region 112 for each pixel 111.

The light receiving element 110 outputs the light receiving signal to the control element 103. The control element 103 performs the signal processing for the light receiving signal and outputs the processed light receiving signal to the outside via at least one terminal 102 among the plurality of terminals 102. The control element 103 of the spectroscope 2 performs the same signal processing as that of the control element 103 of the spectroscope 1.

In the spectroscope 2, the wavelength selection filter unit 200 including the wavelength selection filters 210, 220, 230, 240, 250, and 260 functions as the linear variable filter having the transmission wavelength characteristic in which the transmission wavelength continuously changes from $\lambda a$ to $\lambda g$.

In the spectroscope 2, since the incident light is split by the wavelength selection filter unit 200 functioning as the linear variable filter, the wavelength selection filter unit 200 can be disposed in the vicinity of the pixel region 112 of the light receiving element 110. Accordingly, the spectroscope 2 can be miniaturized in comparison with the spectroscope using the diffraction grating.

In the spectroscope 2, the control element 103 can set the number of pixels in the X-direction and the Y-direction. When the light quantity of the incident light is small, the control element 103 sets the number of pixels to be large, and when the detection accuracy is improved, the control element 103 sets the number of pixels to be small and adds only the light receiving signals of the pixels 111 at the center part. That is, the spectroscope 2 can perform the signal processing for the light receiving signal generated for each pixel 111 depending on the purpose.

In the spectroscope 2, the incident light which is split by the wavelength selection filter unit 200 is converted into the parallel light by the optical element 400, thereby making it possible to be incident on the target pixel 111 with high accuracy.

Third Embodiment

Figure 11:
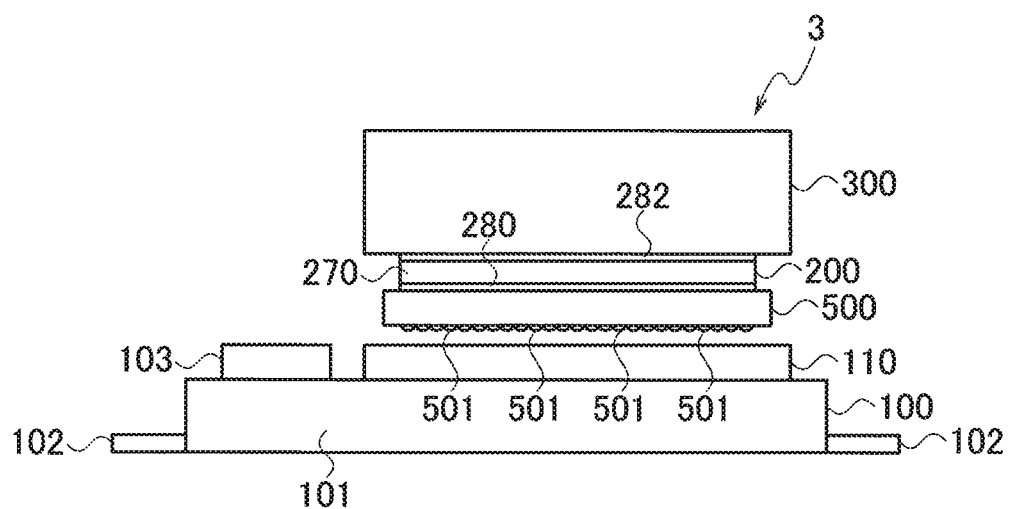
FIG. 11 is a side diagram illustrating a configuration example of a spectroscope according to a third embodiment.

Referring to FIG. 11, a configuration example of a spectroscope according to a third embodiment will be described. FIG. 11 corresponds to FIGS. 2 and 10. Further, in order to simplify descriptions, the same reference signs will be denoted to the same components as those of the spectroscopes 1 and 2 according to the first and second embodiments.

As illustrated in FIG. 11, a spectroscope 3 is provided with the light receiving device 100, the wavelength selection filter unit 200, and optical elements 300 and 500. The light receiving device 100 includes the base 101, the plurality of terminals 102, the control element 103, and the light receiving element 110. The plurality of terminals 102, the control element 103, and the light receiving element 110 are fixed to the base 101. The control element 103 and the light receiving element 110 are connected to the plurality of terminals 102. The light receiving element 110 includes the pixel region 112 in which the plurality of pixels 111 are disposed in the X-direction and the Y-direction.

The optical element 300 converts incident light into parallel light. The incident light which is converted into parallel light by the optical element 300 is incident on the wavelength selection filter unit 200. The wavelength selection filter unit 200 includes the wavelength selection filters 210, 220, 230, 240, 250, and 260. The wavelength selection filters 210, 220, 230, 240, 250, and 260 respectively include the transparent substrate 270 and the dielectric multilayer film 280.

The dielectric multilayer film 280 is formed on a surface which faces the optical element 500 on the transparent substrate 270. The wavelength selection filters 210, 220, 230, 240, 250 and 260 may be configured so that the dielectric multilayer film 282 is formed on a surface which is opposite to a surface of the transparent substrate 270 on which the dielectric multilayer film 280 is formed.

The incident light is split for each wavelength or each wavelength band by the wavelength selection filter unit 200. The incident light which is split by the wavelength selection filter unit 200 is incident on the optical element 500.

In the optical element 500, a plurality of micro-lenses 501 are formed on a surface which faces the pixel region 112 of the light receiving element 110. That is, the optical element 500 includes the plurality of micro-lenses 501 facing the pixel region 112. A region where one micro-lens 501 is formed corresponds to a region where, for example, 20 pieces of the pixels 111 are disposed in the X-direction and the Y-direction respectively in the pixel region 112.

The optical element 500 converts incident light into parallel light. The plurality of micro-lenses 501 focus the incident light which is converted into parallel light by the optical element 500 on the pixel region 112, respectively. The incident light which is split by the wavelength selection filter unit 200 is focused for each wavelength band by the plurality of micro-lenses 501, and is incident on the pixels 111 corresponding to the respective pixel regions 112 of the light receiving element 110.

The control element 103 controls the light receiving element 110 based upon a control signal inputted from the outside via at least one terminal 102 among the plurality of terminals 102. The light receiving element 110 generates a light receiving signal by photoelectrically converting the light incident on the pixel region 112 for each pixel 111.

The light receiving element 110 outputs the light receiving signal to the control element 103. The control element 103 performs the signal processing for the light receiving signal and outputs the processed light receiving signal to the outside via at least one terminal 102 among the plurality of terminals 102. The control element 103 of the spectroscope 3 performs the same signal processing as that of the control element 103 of the spectroscope 1.

In the spectroscope 3, the wavelength selection filter unit 200 including the wavelength selection filters 210, 220, 230, 240, 250, and 260 functions as the linear variable filter having the transmission wavelength characteristic in which the transmission wavelength continuously changes from $\lambda a$ to $\lambda g$.

In the spectroscope 3, since the incident light is split by the wavelength selection filter unit 200 functioning as the linear variable filter, the wavelength selection filter unit 200 can be disposed in the vicinity of the pixel region 112 of the light receiving element 110. Accordingly, the spectroscope 3 can be miniaturized in comparison with the spectroscope using the diffraction grating.

In the spectroscope 3, the control element 103 can set the number of pixels in the X-direction and the Y-direction. When the light quantity of the incident light is small, the control element 103 sets the number of pixels to be large, and when the detection accuracy is improved, the control element 103 sets the number of pixels to be small and adds only the light receiving signals of the pixels 111 at the center part. That is, the spectroscope 3 can perform the signal processing for the light receiving signal generated for each pixel 111 depending on the purpose.

According to the spectroscope 3, the incident light which is split by the wavelength selection filter unit 200 can be incident on the target pixel 111 with high accuracy for each wavelength band by the plurality of micro-lenses 501.

According to the spectroscope 3, the incident light which is split by the wavelength selection filter unit 200 is focused by the plurality of micro-lenses 501 and is incident on the target pixel 111. Accordingly, since the signal level of the light receiving signal generated by the target pixel 111 can be increased, the spectroscope 3 is effective when the light quantity of the incident light is small. Further, according to the spectroscope 3, it is possible to prevent crosstalk caused by a fact that incident light of a wavelength band in the vicinity of the target wavelength band is incident on the target pixel 111, by the plurality of micro-lenses 501.

Fourth Embodiment

Figure 12:
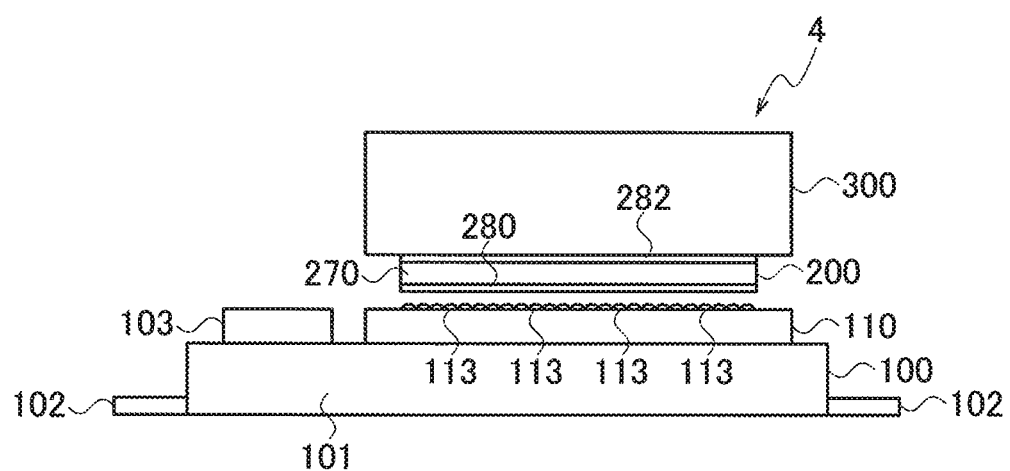
FIG. 12 is a side diagram illustrating a configuration example of a spectroscope according to a fourth embodiment.

Referring to FIG. 12, a configuration example of a spectroscope according to a fourth embodiment will be described. FIG. 12 corresponds to FIGS. 2, 10, and 11. Further, in order to simplify descriptions, the same reference signs will be denoted to the same components as those of the spectroscopes 1 to 3 according to the first to third embodiments.

As illustrated in FIG. 12, a spectroscope 4 is provided with the light receiving device 100, the wavelength selection filter unit 200, and the optical element 300. The light receiving device 100 includes the base 101, the plurality of terminals 102, the control element 103, and the light receiving element 110. The plurality of terminals 102, the control element 103, and the light receiving element 110 are fixed to the base 101. The control element 103 and the light receiving element 110 are connected to the plurality of terminals 102. The light receiving element 110 includes the pixel region 112 in which the plurality of pixels 111 are disposed in the X-direction and the Y-direction.

The optical element 300 converts incident light into parallel light. The incident light which is converted into parallel light by the optical element 300 is incident on the wavelength selection filter unit 200. The wavelength selection filter unit 200 includes the wavelength selection filters 210, 220, 230, 240, 250, and 260. The wavelength selection filters 210, 220, 230, 240, 250, and 260 respectively include the transparent substrate 270 and the dielectric multilayer film 280.

The dielectric multilayer film 280 is formed on a surface which faces the pixel region 112 of the light receiving element 110. The wavelength selection filters 210, 220, 230, 240, 250, and 260 may be configured so that the dielectric multilayer film 282 is formed on a surface which is opposite to a surface of the transparent substrate 270 on which the dielectric multilayer film 280 is formed.

The incident light is split for each wavelength or each wavelength band by the wavelength selection filter unit 200. The incident light which is split by the wavelength selection filter unit 200 is incident on the corresponding pixel 111 of each pixel region 112 of the light receiving element 110.

A micro-lens 113 is formed in the pixel region 112 of the light receiving element 110, while corresponding to each pixel 111. The incident light which is split by the wavelength selection filter unit 200 is focused by the micro-lens 113 and is incident on the corresponding pixel 111, respectively.

The control element 103 controls the light receiving element 110 based upon a control signal inputted from the outside via at least one terminal 102 among the plurality of terminals 102. The light receiving element 110 generates a light receiving signal by photoelectrically converting the light incident on the pixel region 112 for each pixel 111.

The light receiving element 110 outputs the light receiving signal to the control element 103. The control element 103 performs signal processing for the light receiving signal and outputs the processed light receiving signal to the outside through at least one terminal 102 among the plurality of terminals 102. The control element 103 of the spectroscope 4 performs the same signal processing as that of the control element 103 of the spectroscope 1.

In the spectroscope 4, the wavelength selection filter unit 200 including the wavelength selection filters 210, 220, 230, 240, 250, and 260 functions as the linear variable filter having the transmission wavelength characteristic in which the transmission wavelength continuously changes from λa to λg.

In the spectroscope 4, since the incident light is split by the wavelength selection filter unit 200 functioning as the linear variable filter, the wavelength selection filter unit 200 can be disposed in the vicinity of the pixel region 112 of the light receiving element 110. Accordingly, the spectroscope 4 can be miniaturized in comparison with the spectroscope using the diffraction grating.

In the spectroscope 4, the control element 103 can set the number of pixels in the X-direction and the Y-direction. When the light quantity of the incident light is small, the control element 103 sets the number of pixels to be large, and when the detection accuracy is improved, the control element 103 sets the number of pixels to be small and adds only the light receiving signals of the pixels 111 at the center part. That is, the spectroscope 4 can perform the signal processing for the light receiving signal generated for each pixel 111 depending on the purpose.

According to the spectroscope 4, the incident light which is split by the wavelength selection filter unit 200 is focused by the micro-lens 113 and is incident on the center part of the corresponding pixel 111, respectively. Accordingly, detection accuracy of the target pixel 111 can be improved.

The present invention is not limited to the above-mentioned embodiments, and can be modified in various ways without departing from the scope of the gist of the present invention.

In the spectroscopes 1 to 4 according to the first to fourth embodiments, the wavelength selection filter unit 200 is disposed so that the longitudinal directions of the wavelength selection filters 210, 220, 230, 240, 250 and 260 become the X-directions, and alternatively, the wavelength selection filter unit 200 may be disposed so that the longitudinal directions of the wavelength selection filters 210, 220, 230, 240, 250 and 260 may become the Y-directions.

A positional relationship between the wavelength selection filters 210, 220, 230, 240, 250, and 260 is not limited to the configuration of the wavelength selection filter unit 200 of each of the spectroscopes 1 to 4 according to the first to fourth embodiments, and may be arbitrarily disposed.

In the spectroscope 1 according to the first embodiment, the wavelength selection filters 210, 220, 230, 240, 250, and 260 are manufactured by using the plurality of transparent substrates 271 and 272, but the present invention is not limited thereto. For example, after the wavelength selection filters 210, 220, 230, 240, 250, and 260 are formed on one transparent substrate 270, the transparent substrate 270 is cut into the plurality of transparent substrates 271 and 272, and then the wavelength selection filters 210, 230, and 250 may be manufactured from the cut transparent substrate 271 and further the wavelength selection filters 220, 240, and 260 may be manufactured from the cut transparent substrate 272.

What is claimed is:

1. A spectroscope, comprising:
a light receiving element configured to include a pixel region where a plurality of pixels are disposed; and
a wavelength selection filter unit configured to be disposed on the pixel region and configured to include a plurality of wavelength selection filters, wherein
the plurality of wavelength selection filters has transmission wavelength characteristics which are different from each other, and split incident light for each wavelength and each wavelength band, and
the light receiving element generates a light receiving signal by photoelectrically converting the incident light which is split by the plurality of the wavelength selection filters and is incident on the pixel region, for each pixel.

2. The spectroscope according to claim 1, further comprising:
an optical element configured to be disposed on the wavelength selection filter unit and configured to convert the incident light into parallel light.

3. The spectroscope according to claim 2, wherein
the optical element is defined as a first optical element, and
the spectroscope further comprises a second optical element configured to be disposed between the wavelength selection filter unit and the light receiving element and configured to convert light transmitted through the wavelength selection filter unit into parallel light.

4. The spectroscope according to claim 3, wherein
the second optical element comprises:
a plurality of micro-lenses facing the pixel region.

5. The spectroscope according to claim 1, wherein
the pixel region comprises:
a plurality of micro-lenses disposed for each pixel.

6. The spectroscope according to claim 1, further comprising:
a control element configured to control the light receiving element, wherein
the control element sets the number of pixels, and performs signal processing on a light receiving signal of a pixel corresponding to the set number of pixels.

7. The spectroscope according to claim 6, wherein
the control element selects a pixel positioned at a center part of each wavelength selection filter according to the set number of pixels, and performs signal processing on a light receiving signal of a selected pixel.

8. The spectroscope according to claim 7, wherein
each wavelength selection filter has a transmission wavelength characteristic in which a transmission wavelength continuously or stepwise changes from one end part to the other end part in a first direction, and
the control element selects a pixel positioned at a center part of each wavelength selection filter in a second direction according to the number of pixels set in the second direction orthogonal to the first direction of each wavelength selection filter.

9. The spectroscope according to claim 1, wherein
each wavelength selection filter has a transmission wavelength characteristic in which a transmission wavelength changes from one end part to the other end part in a first direction, and
the wavelength selection filter unit has a transmission wavelength characteristic in which a transmission wavelength continuously changes from one end part to the other end part of the wavelength selection filter unit in the first direction, in a state where the respective wavelength selection filters are arranged in a row in the first direction so that end surfaces of the respective end parts in the first direction of the wavelength selection filter are in contact with each other.

10. The spectroscope according to claim 9, wherein
the respective end surfaces of the plurality of wavelength selection filters are cut surfaces.

* * * * *